United States Patent [19]

Wilen

[11] Patent Number: 4,815,225
[45] Date of Patent: Mar. 28, 1989

[54] PROGRAMMING DEVICE

[76] Inventor: Richard Wilen, 8 Roxbury Ct., Oakdale, N.Y. 11769

[21] Appl. No.: 78,119

[22] Filed: Jul. 27, 1987

[51] Int. Cl.⁴ ............................................. G09D 3/04
[52] U.S. Cl. ....................................... 40/119; 40/122
[58] Field of Search .............. 40/119, 122, 120, 124.2, 40/405, 537; 283/2, 3, 4, 1 A, 106

[56] References Cited

U.S. PATENT DOCUMENTS

| | | | |
|---|---|---|---|
| 605,148 | 6/1898 | Sylvester | 40/120 |
| 2,041,652 | 5/1936 | Clark et al. | 40/120 |
| 2,831,279 | 4/1958 | Esslinger, Jr. | 40/119 |
| 3,207,421 | 9/1965 | Hunger et al. | 40/122 |
| 3,290,812 | 12/1966 | Hunkins | 283/2 |
| 3,696,532 | 10/1972 | Nahon | 40/122 |
| 4,232,462 | 11/1980 | Longenecker | 40/119 |
| 4,351,123 | 9/1982 | Cross | 40/120 |
| 4,451,067 | 5/1984 | Williams | 40/124.2 |

Primary Examiner—Robert P. Swiatek
Assistant Examiner—Cary E. Stone
Attorney, Agent, or Firm—Stephen E. Feldman

[57] ABSTRACT

A calender period is set out on one sheet which faces a second sheet. The same calender period is set out on the second sheet but in mirror image to the first sheet. A transparent sheet is disposed between the sheets and is adapted to overlay one sheet or the second sheet. The transparent sheet includes storage pockets corresponding with the calender period set out on the sheets. Data or information placed on both sides of a data or information carrying sheet may then be associated with the same calender date by flipping the transparent sheet from one calender page to the other calender page.

6 Claims, 1 Drawing Sheet

PROGRAMMING DEVICE

BACKGROUND OF THE INVENTION

The present invention relates to programmable calenders. More particularly the present invention relates to apparatus for selectively programming events, such as television (TV) presentation which one intends to view on a monthly basis in which information on the subject of the TV program and information on the time and channel of presentation of such program are displayed on the flip side of a sheet, all coordinated with calenders in mirror image.

In the days of radio, before the advent of television, the programs to be presented over the air by the various radio stations in a local area was presented daily in the local newspaper. Weekly programs of radio presentations were not in popular demand. In newspaper programs of radio, the program was presented on the basis of time.

When television (TV) became popular, for one reason or another the demand for weekly programs of presentations over the air of TV presentations became popular. This public demand for advance knowledge of TV presentation lead to weekly magazines with a detailed daily program of the TV presentations to be displayed for the particular week. Each daily program was set forth on the basis of time.

With the introduction of cable television (CTV) more TV channels were made available to more people and particular TV programs, such as motion pictures shown over TV were repeated on various days and at various times of day so as to satisify more people.

This enlargement of the selection of available channels and the multiplicity of showing the same presentation enlarged public demand for advanced knowledge of TV programs to be presented. This demand lead to a popularization of monthly programs for TV presentations. However, because of the relatively large number of channels available on CTV and daily programs covering each day of the month, which essentially includes thirty (30) or thirty-one (31) days, except for February, that is, monthly TV programs became rather voluminous and complicated both to print and read, time still being the basis factor of the program.

In an attempt to reduce the complications of multiple presentations of the same program at various times and on various channels, attempts were made to present a program where the presentation or show was the main feature and programs were set forth on the basis of the presentation with the time and channel of presentation being secondary information. Thus a person could look over the program to see what was to be displayed and when he found a program or presentation he may be interested in watching, he would then look to find out when the particular program was to be displayed and on which channel.

The change in the approach to presenting TV presentation programming, that is, on the basis of the presentation or program displayed rather than time of display has introduced a new concept of providing advance information on TV presentations, which itself needs simplification.

SUMMARY OF THE INVENTION

The present invention provides a novel concept of TV programs, individual to one's own requirements. Basic TV information, based on the presentation or show, such as a movie or motion picture, for example is set forth on a small sheet of paper, in the form of a stamp, for example. One side of the stamp identifies the presentation or show while on the other side of the stamp the times and channels on which the particular presentation is to be presented is set forth. A monthly calender is provided in book or booklet form in which inside pages provide in mirror image the month in days and dates. Between the mirror image pages of the month calender is a transparent sheet containing pockets which correspond physically to the layout of days and dates. Stamps identifying a particular TV presentation may be placed in a pocket of the transparent sheet and the sheet may be flipped back and forth so as to see the program identification, that is the name of the show on one side, and to see when and where, that is, the time and channel the particular program is to be presented, on the other side, thereof. The stamp identifying the presentation may be positioned in the transparent, pocketed sheet so as to become an over lay on the calender on the date and day of presentation of the identified program, with the stamp showing the name of the program. The transparent pocketed sheet may then be flipped over so that the channel and time of presentation of the particular program may be seen on the other side of the stamp against the date and day (the mirror image of the calender) of the presentation. The stamp may provide information on multiple showings on different days of the month and at different times of the day and if the preferred time and date of presentation is missed the stamp may be moved to another location on the transparent pocketed sheet. Thus, a person may make his own TV viewing schedule, which corresponds to his convenience thereby making a personal TV viewing program.

It is therefore an object of the present invention to provide a programmable calender in which flip-sides of TV information may be presented against mirror images of the same calender period.

Another object is to provide a programmable calender using mirror images of the same calender period in which a TV presentation may be identified against one calender period and the time the TV presentation is to occur may be identified against a mirror image of the same calender period.

These and other objects will become apparent when reading the following detailed discription of a preferred embodiment of the invention with reference to the drawings in which:

DETAILED DESCRIPTION OF THE INVENTION

Figure 1:
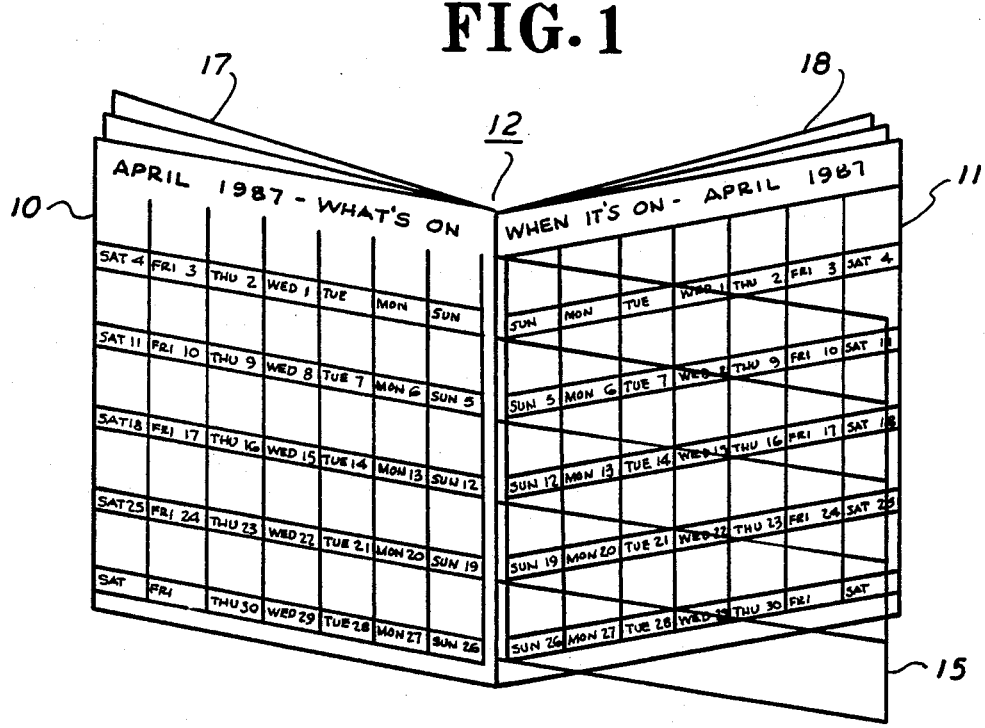
FIG. 1 is a pictorial representation of the present invention.

Referring to FIG. 1, a pictorial representation of a booklet calender is presented wherein the month of APRIL 1987 is provided in calender form, in mirror image on inside pages of the booklet. Inside page 10 and inside page 11 are mirror images of each other with respect to the layout of the days, weeks and dates of the month of APRIL 1987, for example.

Between the mirror calender pages is a transparent sheet 15 which is pocketed with longitudual pockets which are spaced to lay over the days of the week as presented on the faces of the calender. The days of the week are marked off or labeled on the calender faces along with the dates.

Although the month of APRIL 1987 is illustrated the calender arrangement could be any month of the year or any period of time, for example, a week or a number of months or any other time period. It will be appreciated however where TV programming is concerned, which is the form in which the invention is preferrable used, but not to which use of the invention is limited, a month calender is preferred.

Any indicia may be placed on the upper margin, however the legend WHATS ON is appropriate for a presentation such as TV having the connotation of having an identification of a presentation presented to the calender face 10. The legend WHEN IT'S ON is appropriate as the information as to the time of presentation which is denoted by such legend may be presented to the calender face 11, all by flipping the transparent sheet 15.

Other pages in the book 12, such as 17 and 18 may include calender period of other months on inside pages in mirror image.

Figure 2:
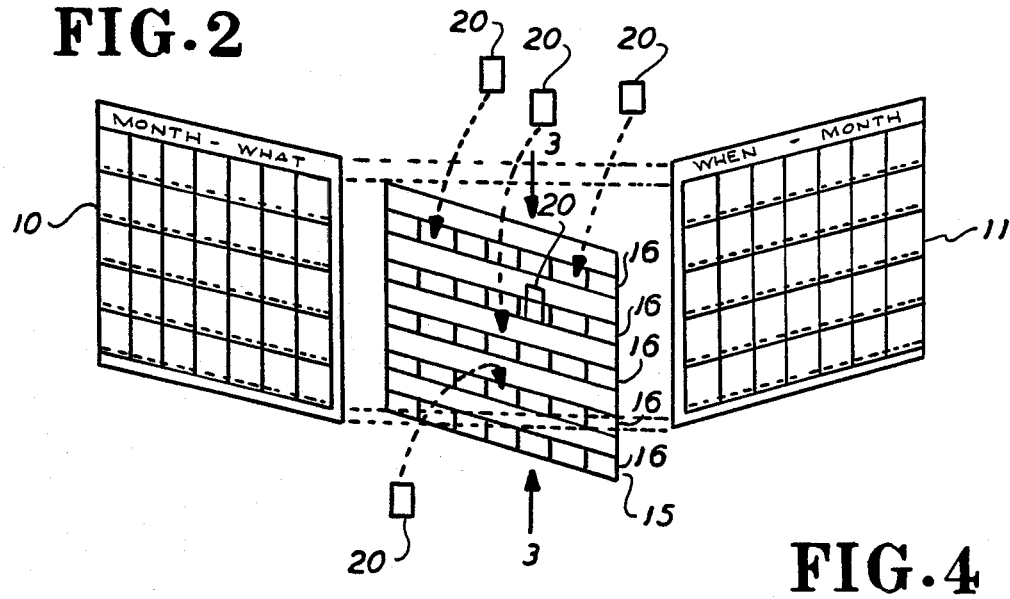
FIG. 2 is an exploded view of the representation of FIG. 1 showing how stamps are inserted in the flip sheet.

FIG. 2 shows the pages 10 and 11 exploded from each other and transparent page 15 also separated in exploded view. The transparent sheet 15 includes pockets 16 extending across the sheet with each longitudinal pocket aligned with the calender week on the face of the calenders. Since the inside calenders are in substantial mirror image the longitudinal pockets 16 will align on corresponding calender week rows of the respective calenders as the transparent sheet is flipped back and forth between the calender faces.

Figure 4:
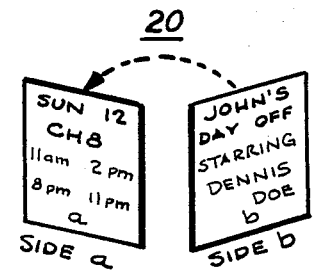

The stamps 20 represent two-faced stamps such as represented in FIG. 4, for example which may be positioned in the pockets of the transparent sheet 15. The stamp or program sheet 20 may be in single configuration, that is time information on side a and program identification on side b or the program sheet may have all its information on one side and be folded so that the information factors are separated, on a side basis by folding the sheet.

Figure 3:
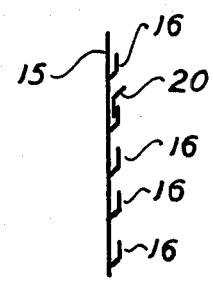
FIG. 3 is a cross section view of the transparent, pocketed flip sheet along line 3; and, FIG. 4 represents opposite sides of the same stamp providing TV information a particular TV presentation.

FIG. 3 represents a cross sectional view of the transparent sheet 15 showing the pockets 16 and an information stamp 20 inserted in one of the pockets. The pockets 16 may be individualized, that is individual to each day or unit of time on the face of the calender or may be open longitudiually.

It is apparent from reading the foregoing description of the preferred embodiment that the present invention is not limited to the use as presented, that is, TV programming but may be used for other predictable and/or future occuring events or data. The taking of medicines, for example may be programmed using the presently disclosed apparatus. The calender feature may be in day or portions of a day or hours of a day if desired. Events, such as planned events and contingent events may be programmed using presently disclosed apparatus. Programming is also not limited to a monthly basis but may be for a shorter or longer period of time. It is also apparent that when the information or data on a particular information stamp indicates that the event or program is to occur on multiple dates, the data carrying stamp, used as a vehicle of information, may be moved from space to space or pocket to pocket, as desired.

It is further apparent that the legends of WHAT and WHEN on the mirror images of the calender may be any reasonable legend appropriate for the use one may make of the apparatus when practicing the invention.

Thus the invention has been described with reference to its preferred use and in its preferred form, with other uses and changes described. Other modification and changes may be made as will be apparent to those skilled in the art without departing from the spirit of the invention as defined in the appended claims.

What is claimed is:

1. A programmable device for programming one or more events to occur on the basis of time of occurance and identification of event, said programmable device comprising:
    (a) a first sheet having a time period set forth in calender form thereon;
    (b) a second sheet having said time period set forth in calender form, said second sheet being a mirror image of said first sheet;
    (c) a transparent sheet disposed between said first sheet and said second sheet for overlaying said first sheet in one position and for overlaying said second sheet in another position, said transparent sheet including pocket means for overlying said calander form on said first sheet when said transparent sheet is in said one position and for overlaying said calender form on said second sheet when said transparent sheet is in said another position.

2. A programmable device as in claim 1 and in which said pocket means further includes means for retaining sheet means for carrying information on each side thereof so that when said transparent sheet is in said one position one side of said sheet means is associated with said first sheet and when said transparent sheet is in another position the other side of said sheet means is associated with said second sheet.

3. A programmable device as in claim 2 and in which said sheet means contains first information on said one side thereof and said sheet means contains second information on said other side thereof and said first information relates to said second information.

4. A programmable device as in claim 1 and in which said first time period is a month and said device further includes means for carrying information, said means being adapted to be inserted into said pocket means.

5. A programmable device as in claim 4 and in which the information carried on said means for carrying information is television program information.

6. A programmable device as in claim 5 and in which the information on said means for carrying information includes identification of the program on one side of said means for carrying and includes information relating to the time of occurance on the other side of said means for carrying.

* * * * *